US007724489B2

(12) United States Patent
Montich

(10) Patent No.: US 7,724,489 B2
(45) **Date of Patent: *May 25, 2010**

(54) CIRCUIT BREAKER WITH HIGH SPEED MECHANICALLY-INTERLOCKED GROUNDING SWITCH

(75) Inventor: Eduardo Montich, Buenos Aires (AR)

(73) Assignee: EMA Electromecanica S.A., Buenos Aires (AR)

( * ) Notice: Subject to any disclaimer, the term of this patent is extended or adjusted under 35 U.S.C. 154(b) by 402 days.

This patent is subject to a terminal disclaimer.

(21) Appl. No.: 11/840,948

(22) Filed: Aug. 18, 2007

(65) Prior Publication Data

US 2009/0045171 A1 Feb. 19, 2009

(51) Int. Cl.
*H02H 7/00* (2006.01)

(52) U.S. Cl. ...................................................... 361/115

(58) Field of Classification Search .................. 361/115
See application file for complete search history.

(56) References Cited

U.S. PATENT DOCUMENTS 6,462,296 B1 * 10/2002 Boettcher et al. ........... 218/154
6,951,993 B2 * 10/2005 Kikukawa et al. ........... 218/118

* cited by examiner

*Primary Examiner*—Stephen W Jackson
(74) *Attorney, Agent, or Firm*—Egbert Law Offices PLLC

(57) ABSTRACT

A circuit breaker apparatus with an integrated grounding switch has a housing with first and second bushings extending outwardly of the housing. A first vacuum bottle is positioned in the housing and has a pair of contactors therein. A second vacuum bottle is positioned in the housing and has a pair of contactors therein. A mechanical linkage is movable between a first position and a second position. The first position electrically connects the first bushing to the second bushing. The second position electrically connects the first bushing to ground. The first vacuum bottle and the second vacuum bottle are longitudinally aligned. The mechanical linkage is interposed between the first and second vacuum bottles.

20 Claims, 5 Drawing Sheets

CIRCUIT BREAKER WITH HIGH SPEED MECHANICALLY-INTERLOCKED GROUNDING SWITCH

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to vacuum circuit breakers. More particularly, the present invention relates to circuit breakers having a mechanically interlocked grounding switch. Additionally, the present invention relates to circuit breakers for use in association with wind farm collection circuits.

2. Description of Related Art Including Information Disclosed Under 37 CFR 1.97 and 37 CFR 1.98.

Wind farms are becoming increasing popular for the generation of electricity. In a wind farm, there are a large number of wind energy generators installed in locations of the country where wind is consistent and substantial. Typically, the wind energy generators will include an array of blades that are coupled to a shaft. The rotation of the shaft caused by the rotation of the blades will produce electrical energy. Electrical lines will connect with the energy generator so as to deliver the energy from a particular wind energy generator to a collection bus. The electrical energy from the various wind energy generators in the wind farm can collectively pass energy to a substation.

Typically, these wind turbines can each produce between 500 kW and 3500 kW of power. The outputs of generators in the wind farm are often grouped into several electrical collection circuits. Transformers are used so as to tie the wind turbine output the conductors to the 34.5 kV collection circuits. The transformers serve to step up the output voltage of the wind energy generators to a medium voltage, usually 34.5 kilovolts. The various wind turbines in a wind farm are usually paralleled into collection circuits that can deliver 15 to 30 megawatts of power. In view of the voltage which has been stepped up to the 34.5 kilovolts, each collection circuit will require a circuit breaker rated at a minimum 34.5 kilovolts capacity. The energy will pass through the circuit breaker to the 34.5 kV bus of a substation. The 34.5 kV substation bus will go into one or more main step-up transformers and then tie into a high voltage utility line. As such, a need has developed so as to provide a circuit breaker that can tie collection circuits into the 34.5 kV substation bus. Such a circuit breaker should be of low cost, weatherproof, and able to effectively break the current in the event of a problem condition.

Typically, with circuit breakers, the circuit to the substation can be broken upon the application of a manual force to a button or lever of the circuit breaker or by an automatic relay which opens the circuit. Typically, the current is measured to the substation. If any relay senses a problem, then a signal is transmitted to the circuit breaker so as to open the breaker. Typically, the relays will be maintained within the substation. The opening of the circuit breaker will prevent the energy from being continued to be transmitted to the substation. Sometimes, the circuit breaker is open so as to allow users to work on the wind farm system, on the circuit breaker, or on the substation. Typically, the relays will operate if the sensors sense a voltage drop.

The interruption of electrical power circuits has always been an essential function, especially in cases of overloads or short circuits, when immediate interruption of the current flow becomes necessary as a protective measure. In earliest times, circuits could be broken only by separation of contacts in air followed by drawing the resulting electric arc out to such a length that it can no longer be maintained. This means of interruption soon became inadequate and special devices, termed “circuit breakers”, were developed. The basic problem is to control and quench the high power arc. This necessarily occurs at the separating contacts of a breaker when opening high current circuits. Since arcs generate a great deal of heat energy which is often destructive to the breaker’s contacts, it is necessary to limit the duration of the arc and to develop contacts that can withstand the effect of the arc time after time.

A vacuum circuit breaker uses the rapid dielectric recovery and high dielectric strength of the vacuum. The pair of contacts are hermetically sealed in the vacuum envelope. An actuating motion is transmitted through bellows to the movable contact. When the electrodes are parted, an arc is produced and supported by metallic vapor boiled from the electrodes. Vapor particles expand into the vacuum and condense on solid surfaces. At a natural current zero the vapor particles disappear and the arc is extinguished.

In the past, various patents have issued relating to such vacuum circuit breakers. For example, U.S. Pat. No. 5,612,523, issued on Mar. 18, 1997 to Hakamata et al., teaches a vacuum circuit-breaker and electrode assembly. A portion of a highly conductive metal member is infiltrated in voids of a porous high melting point metal member. Both of the metal members are integrally joined to each other. An arc electrode portion is formed of a high melting point area in which the highly conductive metal is infiltrated in voids of the high melting point metal member. A coil electrode portion is formed by hollowing out the interior of a highly conductive metal area composed only of the highly conductive metal and by forming slits thereon. A rod is brazed on the rear surface of the coil electrode portion.

U.S. Pat. No. 6,048,216, issued on Apr. 11, 2000 to Komuro, describes a vacuum circuit breaker having a fixed electrode and a movable electrode. An arc electrode support member serves to support the arc electrode. A coil electrode is contiguous to the arc electrode support member. This vacuum circuit breaker is a highly reliable electrode of high strength which will undergoes little change with the lapse of time.

U.S. Pat. No. 6,759,617, issued on Jul. 6, 2004 to S. J. Yoon, describes a vacuum circuit breaker having a plurality of switching mechanisms with movable contacts and stationary contacts for connecting/breaking an electrical circuit between an electric source and an electric load. The actuator unit includes at least one rotary shaft for providing the movable contacts with dynamic power so as to move to positions contacting the stationary contacts or positions separating from the stationary contacts. A supporting frame fixes and supports the switching mechanism units and the actuator unit. A transfer link unit is used to transfer the rotating movement of the rotary shaft to a plurality of vertical movements.

U.S. Pat. No. 7,223,923, issued on May 28, 2007 to Kobayashi et al., provides a vacuum switchgear. This vacuum switchgear includes an electro-conductive outer vacuum container and a plurality of inner containers disposed in the outer vacuum container. The inner containers and the outer container are electrically isolated from each other. One of the inner vacuum containers accommodates a ground switch for keeping the circuit open while the switchgear is opened. A movable electrode is connected to an operating mechanism and a fixed electrode connected to a fixed electrode rod. Another inner vacuum container accommodates a function switch capable of having at least one of the functions of a circuit breaker, a disconnector and a load switch.

In the past, in association with such wind farms, when collect circuit breakers are opened, the collection circuit voltage would be interrupted and a transient overvoltage situation could occur in the collection circuit. In the over voltage situation, the high transient voltage in the collection circuit line will “back up” through the circuit and to the electronics associated with the wind energy generators. As a result, this transient overvoltage could cause damage to the circuitry associated with the wind energy generators and other circuitry throughout the system. As a result, in view of the characteristics of the large energy resident within by the overall wind energy farm, there is an extreme need to hold within acceptable limits any overvoltage which occurs when the circuit breaker is be opened.

Typically, to avoid the over voltage situation, grounding transformers have been required to be installed. These grounding transformers would typically have 34.5 kilovolts on the primary winding with a 600 volts open delta secondary winding. The transformer has a core with windings therearound. In view of the core and windings, there was continuous amount of core losses of energy associated with the use of such grounding transformers. Over time, the core losses could amount to a significant dollar amount of lost energy. Additionally, these grounding transformers had a relatively high initial cost, installation cost, and a long lead time of delivery.

FIG. 1 is an illustration of a prior art system employing a ground transformer. As can be seen, wind power generators 10, 12, 14 and 16 are connected respective lines 18, 20, 22 and 24 to a bus 26 via step-up transformers 17, 19, 21 and 23. The bus 26 has a switch 28 located therealong. The grounding transformer 30 is connected forwardly of the switch 28. When the switch 28 is opened, as illustrated in FIG. 1, the energy along the bus 26 is passed to the ground transformer 30 and to ground. When the switch 28 is closed, the energy from the bus 26 is passed along another bus 32 for passage to the circuit breaker 34 and then along line 36 to the substation 38. When the ground transformer 30 is effectively used, then any over voltages are immediately transferred to ground in an acceptable manner. As can be seen in FIG. 1, when the circuit breaker 34 is activated so as to open the circuit, a signal can be passed along line 40 to the switch 28 so as to open the switch 28 and to cause the energy in the bus 26 to pass to the ground transformer 30.

When ground transformers are not used, it is necessary to switch the circuit to ground extremely quickly. If the switch does not occur within a maximum of three cycles, then the overvoltage condition can occur. Ideally, to avoid any potential for an overvoltage situation, it is necessary to close the circuit to ground within one cycle, i.e. 16 milliseconds. Ultimately, experiments in attempting to achieve electrical switching systems indicated that the switching would occur at a level dangerously close to the five cycle limit. Preferably, it is desirable to cause the switching to occur in as close to an instantaneous manner as possible.

It is an object of the present invention to provide a vacuum circuit breaker with an integral high speed grounding switch of a relatively low cost.

It is another object of the present invention to provide a vacuum circuit breaker with an integral high speed grounding switch that is weatherproof.

It is a further object of the present invention to provide a vacuum circuit breaker with an integral high speed grounding switch which eliminates the need for ground transformers.

It is a further object of the present invention to provide a vacuum circuit breaker with an integral high speed grounding switch which minimizes energy losses.

It is still a further object of the present invention to provide a vacuum circuit breaker with an integral high speed grounding switch that closes the circuit to ground virtually instantaneously.

It is still a further object of the present invention to provide a vacuum circuit breaker with an integral high speed grounding switch that can be operated in the range of 34.5 kilovolts.

It is still another object of the present invention to provide a vacuum circuit breaker that is effective for use in association with wind farm energy production.

These and other objects and advantages of the present invention will become apparent from a reading of the attached specification and appended claims.

BRIEF SUMMARY OF THE INVENTION

The present invention is a circuit breaker apparatus that comprises a housing, a first set of bushings extending outwardly of the housing, a second set of bushings extending outwardly of the housing, a first vacuum bottle positioned in the housing and having pairs of contactors therein, a second set of vacuum bottles positioned in the housing and having pairs of contactors therein, and a mechanical linkage movable between a first position and a second position. One of the pair of the contactors of the first vacuum bottle is electrically interconnected to the second bushing. One of the pair of contactors of the second vacuum bottle is electrically interconnected to ground. The first position serves to electrically connect the first bushing to the second bushing. The second position serves to electrically connect the first bushing to ground.

An actuator serves to move the mechanical linkage between the first position and the second position. The first vacuum bottle is in longitudinal alignment with the second vacuum bottle. The mechanical linkage is interposed between the first and second vacuum bottles.

The mechanical linkage comprises an actuator arm having the other of the pair of contactors of the first vacuum bottle electrically connected thereto. The actuator arm has the other of the pair of contactors of the second vacuum bottle electrically connected thereto. The pair of contactors of the first vacuum bottle being electrically connected together when in the first position. The pair of contactors of the first vacuum bottle are electrically isolated from each other in the second position. The pair of contactors of second vacuum bottle are electrically isolated from each other in the first position. The pair of contactors of the second vacuum bottle are electrically connected together in the second position.

The present invention is also a circuit breaker apparatus that comprises a first vacuum bottle having a first contactor and a second contactor therein, a second vacuum bottle having a first contactor and a second contactor therein, an actuator arm connected at one end to the second contactor of the first vacuum bottle and to the first contactor of the second vacuum bottle, and a means for moving the actuator arm between a first position in which the second contactor contacts the first contactor of the first vacuum bottle and a second position in which the first contactor contacts the second contactor of the second vacuum bottle. The second contactor of the second vacuum bottle is connected to ground. The actuator arm is interconnected to a supply of power. In particular, a power supply is connected by a line to the actuator arm. A substation is connected by a line to the first contactor of the first vacuum bottle. Power is passed from the power supply to the substation when the actuator arm is in the first position. The power supply has a three phase current. As such, the first vacuum bottle includes three vacuum bottles and the second vacuum bottle comprises three vacuum bottles. The first contactor in each of the three vacuum bottles is connected to a separate phase of the power supply. The actuator arm is electrically interconnected to a first bushing. The first contactor of the first vacuum bottle is connected to a second bushing. The first bushing is connected to the power supply while the second bushing is connected to the substation. At least one first current transformer extends around the first bushing. A second current transformer extends around the second bushing. The power supply will have a nominal voltage of 34.5 kilovolts or lower.

The present invention is also a system for passing energy from a power supply to substation. This system comprises a bus suitable for passing energy from the power supply, a line connected to ground, a circuit suitable for passing energy from the bus to the substation, and a circuit beaker interconnected between a contactor of the bus and a contactor of the line and a contactor of the circuit. The circuit breaker has means for mechanically and selectively connecting the contactor of the bus to the contactor of the circuit and for connecting the contactor of the bus to the contactor for the line. The first vacuum bottle has the contactor for the bus and the contactor for the circuit therein. The second vacuum bottle has the contactor for the line therein. The mechanical interlock extends between the first and second vacuum bottles and is electrically interconnected to the bus. The plurality of wind energy generators are connected to the bus.

DETAILED DESCRIPTION OF THE INVENTION

Figure 1:
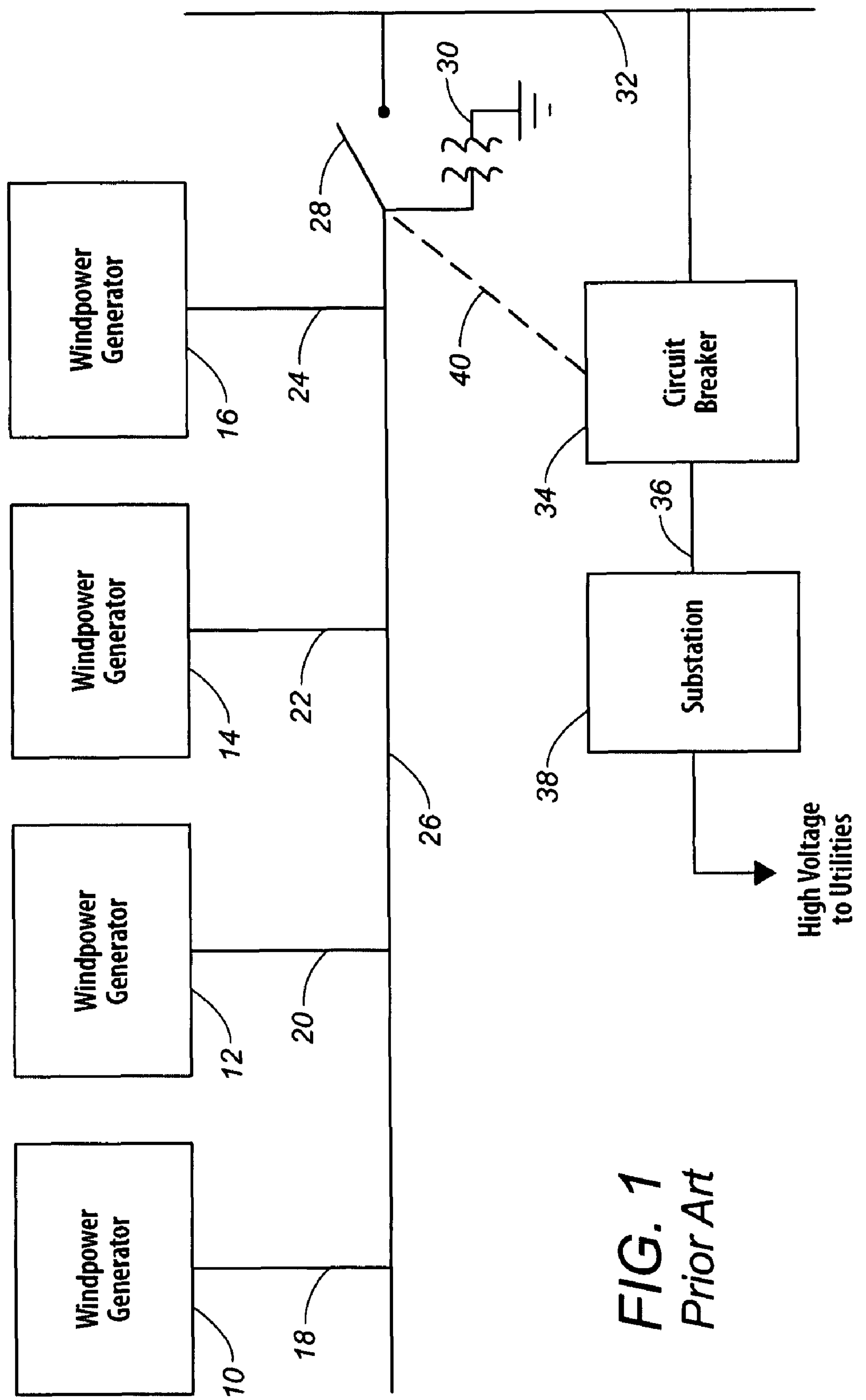
FIG. 1 Prior Art
FIG. 1 is a block diagram showing the operation of a prior art circuit breaker system.
Figure 2:
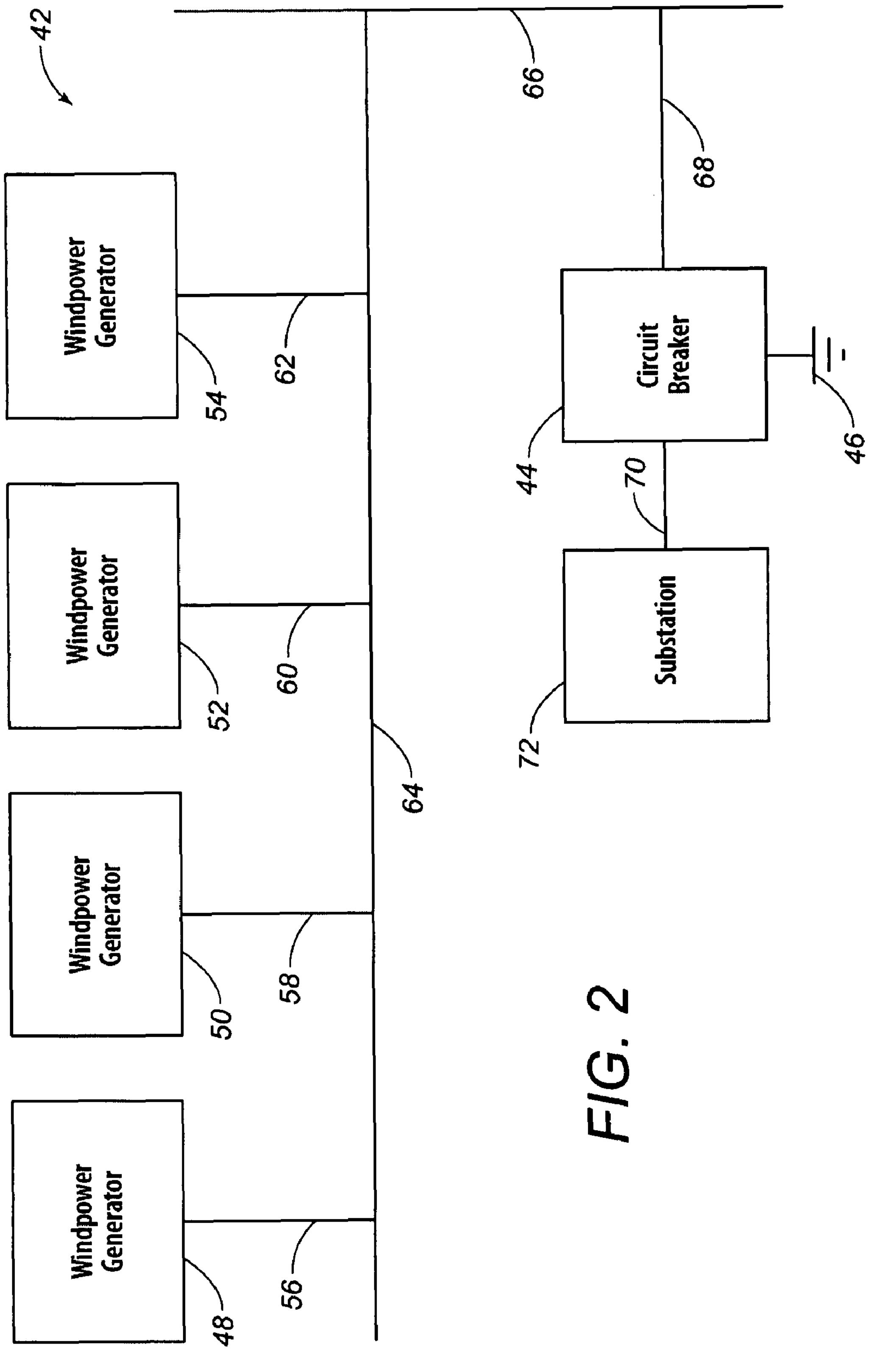
FIG. 2 is a block diagram showing the circuit breaker system of the present invention.

Referring to FIG. 2, there is shown the system 42 of the present invention. The circuit breaker system 42 of the present invention includes the circuit breaker apparatus 44 as used for transferring energy upon the opening of the circuit to ground 46. A plurality of wind energy generators 48, 50, 52 and 54 are connected by respective conductors 56, 58, 60 and 62 to a bus 64. The wind energy generators 48, 50, 52 and 54 can be a portion of a wind farm. As such, various busses 64 can also be connected to a main energy transfer bus 66. Ultimately, the energy is transmitted along line 68 to the circuit breaker 44. When the circuit breaker 44 is suitably closed, then the energy will be delivered along line 70 to substation 72. It can be seen in FIG. 2 that the bus 64 does not include the grounding transformer 30 of the prior art. As such, it is the goal of the circuit breaker 44 (with grounding switch) to switch the energy to ground 46 as quickly as possible, preferably, within one cycle (i.e., within 16 milliseconds).

Figure 3:
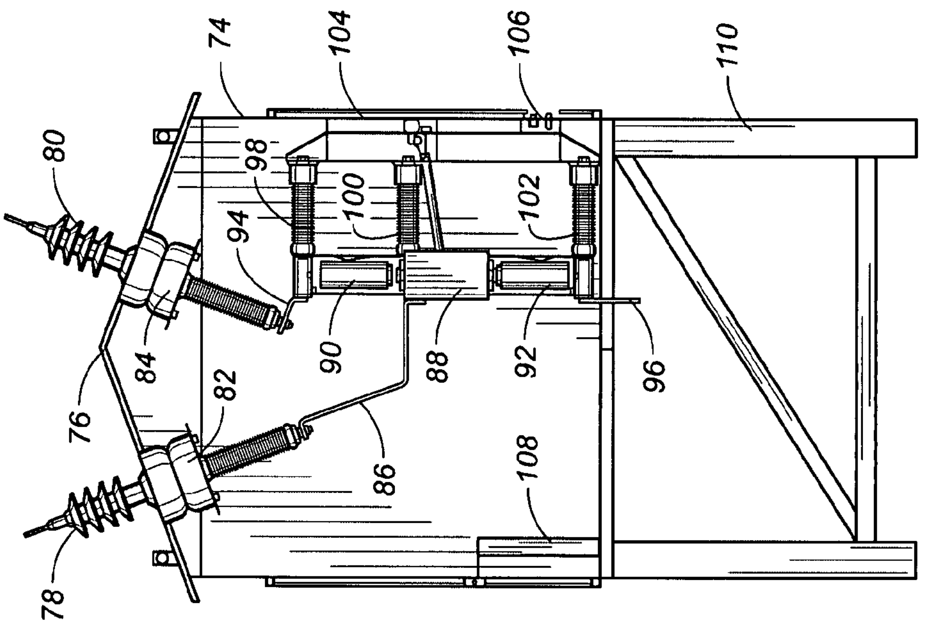
FIG. 3 is a side interior view of the circuit breaker of the preferred embodiment of the present invention.

FIG. 3 shows the circuit breaker 44 of the present invention. Circuit breaker 44 includes a housing 74 having a weather proof roof 76 extending thereover. A first bushing 78 and a second bushing 80 extend outwardly of the housing 74 and through the roof 76. Bushing 78 will extend to the wind farm side of the circuit. Bushing 80 will extend to the substation side of the circuit. A first current transformer 82 is positioned over the bushing 78. The current transformer 82 is a doughnut-shaped transformer which serves to detect the amount of current passing through the first bushing 78. As such, the current transformer 82 serves to monitor the power, and the quality of power passing through bushing 78. The current transformer 82 can be electrically interconnected to a suitable relay for opening and closing the circuit breaker in the event of the detection of a problem with the power transmission, or other requirements of the opening or closing of the circuit breaker.

The bushing 80 has another current transformer 84 extending therearound. Current transformer 84 is a configuration similar to that of current transformer 82. Current transformer 84 serves to sense the power, and the quality of power passing outwardly of the circuit breaker 44 and to the substation. Once again, the current transformer 84 can be suitably interconnected to proper relays so as to open and close the circuit breaker 44 in the event of a problem condition.

A busbar 86 connects the bushing 78 to the mechanical interlock 88. The mechanical interlock 88 is interposed between a first vacuum bottle 90 and a second vacuum bottle 92. Another busbar 94 is located at the top of the first vacuum bottle 90 and extends in electrical connection to the second bushing 80. The second vacuum bottle 92 includes a grounding bar 96 suitably connected to ground. Supports 98, 100 and 102 will maintain the vacuum bottles 90 and 92, along with the mechanical interlock 88, in a longitudinally aligned orientation extending substantially vertically within the interior of the housing 74. A suitable operating and communication mechanism 104 is cooperative with the mechanical interlock 88. Control push buttons and indicating lamps 106 are located on a wall of the enclosure 74 so as to provide a humanly perceivable indication of the operation of the circuit breaker 44 and allowing for manual control of the mechanical interlock 88. There is an auxiliary terminal block compartment 108 located on an opposite wall of the enclosure 74 from the control push buttons 106. The housing 74 is supported above the earth by legs 110 (or by other means).

Figure 4:
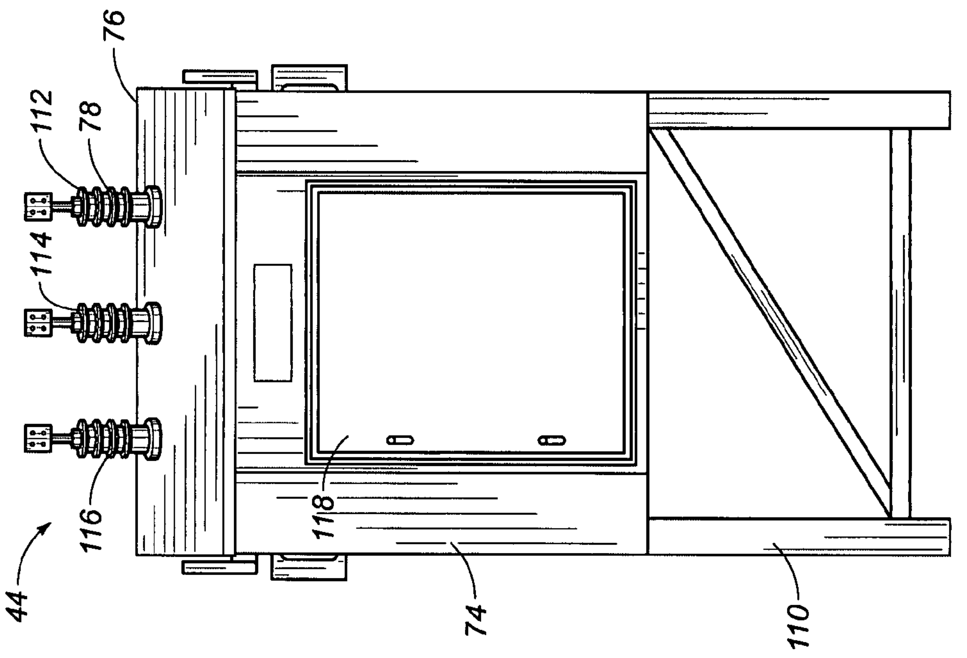
FIG. 4 is a frontal elevation of the circuit breaker of the preferred embodiment present invention.

FIG. 4 shows a frontal view of the housing 74 of the circuit breaker 44. Importantly, in FIG. 4, it can be seen that the bushing 78 actually includes a first bushing 112, a second bushing 114 and a third bushing 116 extending outwardly of the roof 76 of housing 74. The bushings 112, 114 and 116 will correspond to the three phases of current passing as energy from the wind farm. Similarly, the second bushing 80 will also have an array of three of such bushings such that the three phases can be passed from the circuit breaker.

A door 118 is mounted on the housing 74 so as to allow easy access to the interior of the housing 74. Legs 110 serve to support the housing 74 above the earth.

Figure 5:
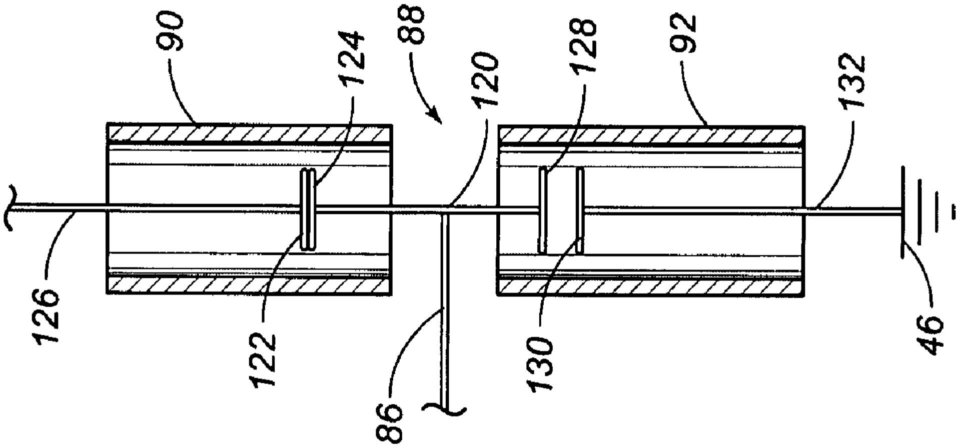
FIG. 5 is an illustration of the mechanical interlock of the present invention in combination of the first and second vacuum bottles with the mechanical interlock in the first position.

FIG. 5 illustrates the operation of the mechanical interlock 88 of the present invention. As can be seen, the mechanical interlock 88 includes an actuator arm 120 which extends between the first vacuum bottle 90 and the second vacuum bottle 92. The busbar 86 is electrically interconnected to the actuator arm 120.

The first vacuum bottle 90 is hermetically sealed in a vacuum condition. The first vacuum bottle 90 includes a first contactor 122 and a second contactor 124 within the interior of the vacuum bottle 90. The first contactor 122 is connected by conductor 126 in electrical interconnection to the second bushing 80. The second vacuum bottle 92 includes a first contactor 128 and a second contactor 130. The second contactor 130 is connected by conductor 132 to ground 46.

In FIG. 5, the actuator arm 120 is in its first position. In this position, the contactors 122 and 124 are juxtaposed together so as to be in electrical connection. As such, power passing along busbar 86 will be transmitted through the interior of the first vacuum bottle 90 through conductor 126 to the bushing 80. The circuit to ground through the second vacuum bottle 92 is open. As such, FIG. 5 illustrates the normal operating condition of the circuit breaker 44 of the present invention in which the power is passed directly therethrough to the substation 72.

Figure 6:
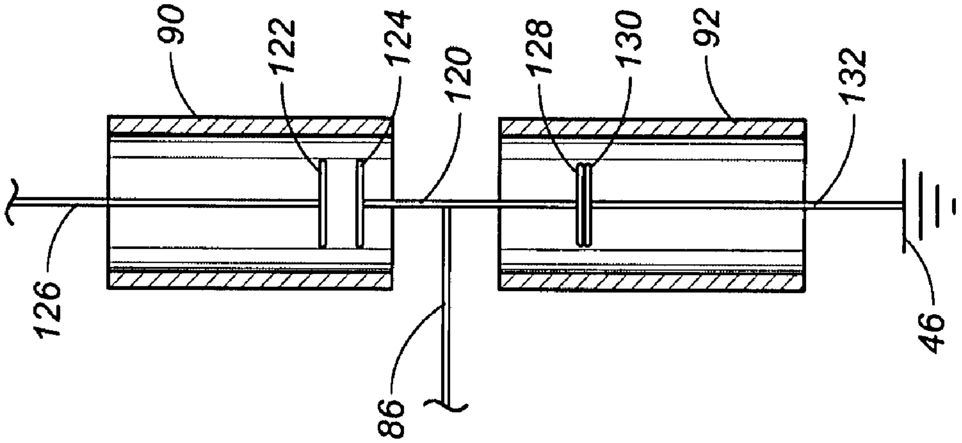
FIG. 6 is an illustration of the operation of the mechanical interlock of the present invention with the mechanical interlock in a second position.

In the event of an interruption, a failure, or a problem, the circuit breaker 44 will open the circuit to the substation so that the electrical energy passing through the busbar 86 is passed to ground 46 instantaneously. As can be seen in FIG. 6, the first contactor 122 is electrically isolated from the second contactor 124 within the interior of vacuum bottle 90. As such, the conductor 126 is electrically isolated from power passing from the busbar 86. The actuator arm 120 instantaneously separates the contactor 124 from the contactor 122 while, at the same time, establishes an electrical connection between the contactor 128 and the contactor 130 in the second vacuum bottle 92. As such, the power from the busbar 86 is immediately switched to ground 46.

A variety of techniques can be utilized for moving the actuator arm 120 between the first and second position. For example, latches, springs, magnets, or other devices can be employed so as to instantaneously shift the actuator arm 120 between the first and second positions. Importantly, the vertical alignment of the first vacuum bottle 90 with the second vacuum bottle 92 assures that this mechanical connection instantaneously serves to transfer energy. The present invention avoids the need for electrical interconnections. Experiments with the system of the present invention have indicated that the switching can occur in less than one cycle.

Figure 7:
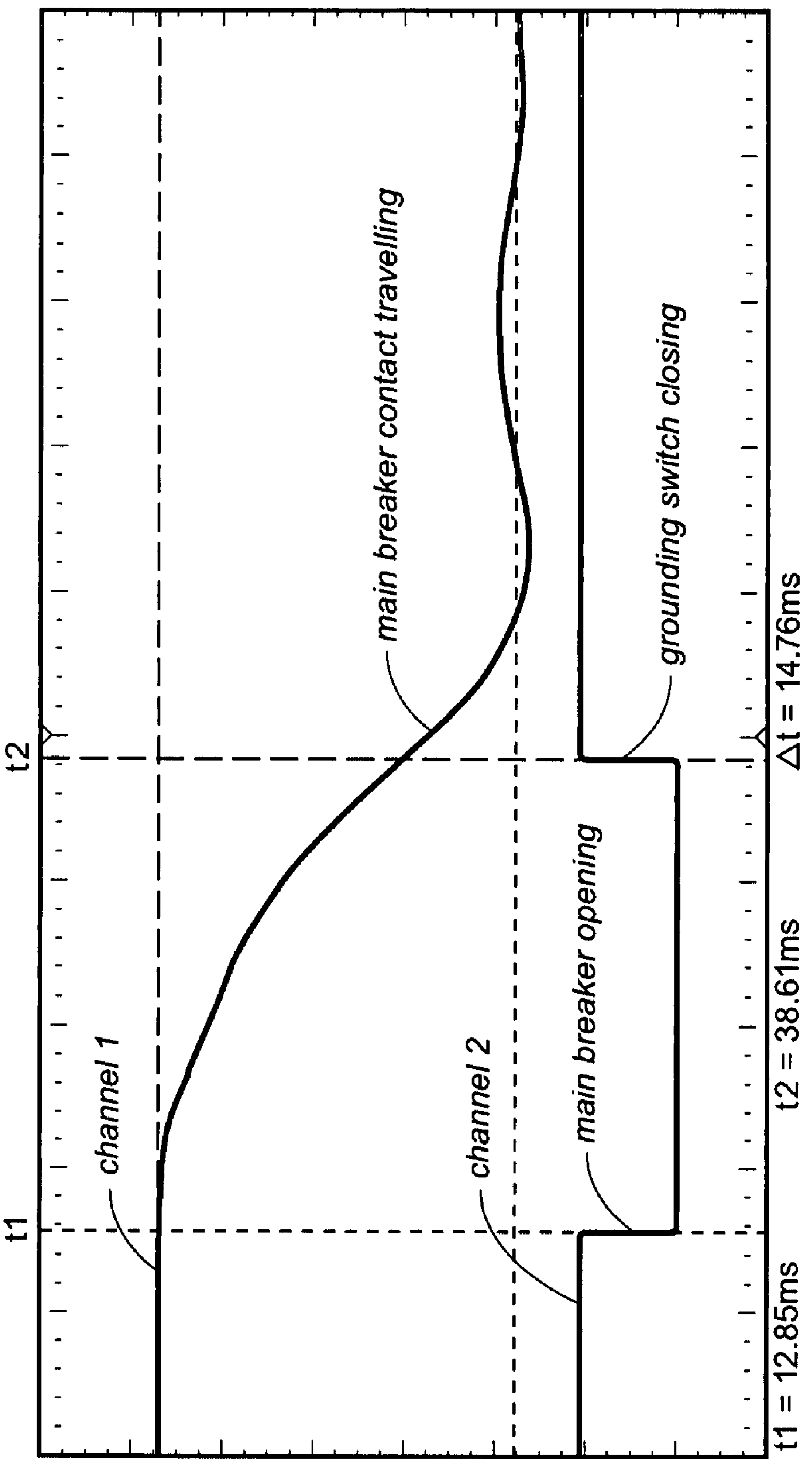
FIG. 7 is a graph showing the switch operation of the circuit breaker of the present invention.

In FIG. 7, the near instantaneous switching can be easily seen. In FIG. 7, channel one is the analogical representation of the main breaker contact traveling. Channel two is the logical representation of the contacts position of both the main breaker and the grounding switch, connected in a parallel circuit. The oscillogram of FIG. 7 shows that the complete switching sequence (i.e. the time duration for opening the main breaker through closing the grounding switch) is accomplished in 14.76 milliseconds. The main breaker contact traveled more than 75% of its total stroke when the grounding switch is closed. The main breaker (i.e. the upper vacuum interrupts) connects the generator collection circuits to the transformer bus. The high speed, mechanically-interlocked grounding switch (i.e. the lower vacuum interrupters) connects the collection circuits automatically to ground. This occurs with a complete switching sequence of less than one cycle (between 12 to 16 milliseconds). As a result, the transient voltage does not rise enough during the one cycle to be above the limits of the arresters or the allowable rise at the wind turbine controllers.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A circuit breaker apparatus comprising:
- a housing;
- a first bushing outwardly of said housing;
- a second bushing extending outwardly of said housing;
- a first vacuum bottle positioned in said housing and having a pair of contactors therein, one of said pair of contactors being electrically interconnected to said second bushing;
- a second vacuum bottle positioned in said housing and having a pair of contactors therein, one of said pair of contactors of said second vacuum bottle being electrically interconnected to ground; and
- mechanical linkage movable between a first position and a second position, said first position electrically connecting said first bushing to said second bushing, said second position electrically connecting said first bushing to ground.

2. The circuit breaker apparatus of claim 1, further comprising:
- an actuating means for moving said mechanical linkage between said first position and said second position.

3. The circuit breaker apparatus of claim 1, said first vacuum bottle in longitudinal alignment with said second vacuum bottle, said mechanical linkage interposed between said first vacuum bottle and said second bottle.

4. The circuit breaker apparatus of claim 1, said mechanical linkage comprising an actuator arm having the other of said pair contactors of said first vacuum bottle electrically connected thereto, said actuator arm having the other of said pair of contactors of said second vacuum bottle electrically connected thereto.

5. The circuit breaker apparatus of claim 1, said pair of contactors of said first vacuum bottle being electrically connected together in said first position, said pair of contactors of said first vacuum bottle being electrically isolated from each other in said second position.

6. The circuit breaker apparatus of claim 5, said pair of contactors of said second vacuum bottle being electrically isolated from each other in said first position, said pair of contactors of said second vacuum bottle being electrically connected together in said second position.

7. A circuit breaker apparatus comprising:
- a first vacuum bottle having a first contactor and a second contactor therein;
- a second vacuum bottle having a first contactor and a second contactor therein;

an actuator arm connected at one end to said second contactor of said first vacuum bottle and to said first contactor of said second vacuum bottle; and a means for moving said actuator arm between a first position in which said second contactor of said first vacuum bottle contacts said first contactor of said first vacuum bottle and a second position in which said first contactor of said second vacuum bottle contacts said second contactor of said second vacuum bottle.

8. The circuit breaker apparatus of claim 7, said second contactor of said second vacuum bottle being connected to ground.

9. The circuit breaker apparatus of claim 7, said actuator arm being interconnected to a supply of power.

10. The circuit breaker apparatus of claim 7, further comprising:

a power supply connected by a line to said actuator arm; and a substation connected by a line to said first contactor of said first vacuum bottle, said means for passing power from said power supply to said substation when said actuator arm is in said first position.

11. The circuit breaker apparatus of claim 10, said power supply having a three phase current, said vacuum bottle comprising three vacuum bottles, the first contactor in each of said three vacuum bottles being connected to a separate phase of said power supply.

12. The circuit breaker apparatus of claim 10, said actuator arm being electrically interconnected to a first bushing, said first contactor of said first vacuum bottle being connected to a second bushing, said first bushing being connected to said power supply, said second bushing connected to said substation.

13. The circuit breaker apparatus of claim 12, further comprising:

an enclosure extending over and around said first and second vacuum bottles, said first and second bushings extending outwardly of said enclosure.

14. The circuit breaker apparatus of claim 12, further comprising:

at least one first current transformer extending around said first bushing; and at least one second current transformer extending around said second bushing.

15. The circuit breaker apparatus of claim 10, said power supply having a voltage of no more than 34.5 kilovolts.

16. The circuit breaker apparatus of claim 10, said power supply being from a plurality of wind energy generators.

17. A system for passing energy from a power supply to a substation comprising:

a bus suitable for passing energy from the power supply;

a line connected to ground;

a circuit suitable for passing energy from said bus to the substation; and a circuit beaker interconnected between a contactor of said bus and a contactor of said line and a contactor of said circuit, said circuit breaker having means for mechanically and selectively connecting the contactor of the bus to the contactor of the circuit and for connecting the contactor of the bus to the contactor for the line.

18. The system of claim 17, further comprising:

a first vacuum bottle having the contactor for the bus and the contactor for the circuit therein;

a second vacuum bottle having the contactor for the line therein; and a mechanical linkage extending between the first and second vacuum bottles, said mechanical linkage being electrically interconnected to said bus.

19. The system of claim 17, further comprising:

a plurality of wind energy generators in electrical connection to said bus.

20. The system of claim 17, said means for connecting the contactor of said bus to the contactor for said line occurring in a time of less than 16 milliseconds.

* * * * *